United States Patent [19]
Barbier et al.

[11] Patent Number: 5,209,067
[45] Date of Patent: May 11, 1993

[54] GAS TURBINE COMBUSTION CHAMBER WALL STRUCTURE FOR MINIMIZING COOLING FILM DISTURBANCES

[75] Inventors: Gérard Y. G. Barbier, Morangis; Frédéric Beule, Charenton Le Pont; Michel A. A. Desaulty, Vert Saint Denis; Jean M. C. M. P. Latour, La Chaussee Saint Victor; Bruno R. H. Masse, Vaux Le Penil, all of France

[73] Assignee: S.N.E.C.M.A. Societe Nationale d'Etude et de Construction de Moteurs D'Aviation, Paris, France

[21] Appl. No.: 778,283

[22] Filed: Oct. 17, 1991

[30] Foreign Application Priority Data

Oct. 17, 1990 [FR] France ................. 90 12785

[51] Int. Cl.⁵ .................. F23R 3/06; F23R 3/08
[52] U.S. Cl. ......................... 60/757; 60/759
[58] Field of Search .......... 60/752, 755, 757, 759, 60/760, 756

[56] References Cited

U.S. PATENT DOCUMENTS

| | | | |
|---|---|---|---|
| 2,742,762 | 4/1956 | Kuhring | 60/752 |
| 2,979,898 | 4/1961 | Ward | 60/759 |
| 3,899,884 | 8/1975 | Ekstedt | 60/751 |
| 4,302,941 | 12/1981 | DuBell | 60/757 |
| 4,315,405 | 2/1982 | Pidcock et al. | 60/752 |
| 4,329,848 | 5/1982 | Caruel et al. | 60/757 |
| 4,622,821 | 11/1986 | Madden | 60/757 |
| 4,896,510 | 1/1990 | Folz | 60/757 |

FOREIGN PATENT DOCUMENTS

| | | |
|---|---|---|
| 0187731 | 7/1986 | European Pat. Off. . |
| 2531748 | 2/1983 | France . |
| 2020370 | 11/1979 | United Kingdom ........ 60/752 |
| 2074307 | 10/1981 | United Kingdom . |
| 2113377 | 8/1983 | United Kingdom ........ 60/752 |
| 2125950 | 3/1984 | United Kingdom ........ 60/752 |

OTHER PUBLICATIONS

"Messungen des Warmeubergangs an filmgekuhlten Flammrohr-Wandelementen" vol. 27(1975) Nr. 5, Mai–D. Wahl, G. Kappler & J. Schmidt, Munchen.

Primary Examiner—Richard A. Bertsch
Assistant Examiner—Timothy S. Thorpe
Attorney, Agent, or Firm—Bacon & Thomas

[57] ABSTRACT

A combustion chamber wall structure is formed of a plurality of segments, each segment having an upstream portion and a downstream portion. The upstream portion is attached to an outer surface of an adjacent wall segment at its downstream portion in an overlapping fashion such that the overlapping portions form a cooling air chamber. The main cooling air holes are defined by the upstream portion so as to communicate with the cooling chamber, which has an exit to direct the cooling air along an inner surface of the downstream portion of the wall segment. A primary air hole is defined by the downstream portion of the segment and is located adjacent to the main cooling air holes. This location maximizes the distance between the primary air hole and an upstream portion of the same segment, which, in turn, maximizes the distance along the inner surface of the segment on which the cooling air may flow without being disrupted by air passing through the primary air hole. The guidance of the primary/dilution air streams can also be carried out by a portion of the downstream air cooling film.

12 Claims, 2 Drawing Sheets

GAS TURBINE COMBUSTION CHAMBER WALL STRUCTURE FOR MINIMIZING COOLING FILM DISTURBANCES

BACKGROUND OF THE INVENTION

The present invention relates to a wall structure for a combustion chamber, more particularly such a wall structure which minimizes turbulence to the cooling air passing along an inner surface of the combustion chamber wall.

It is known from U.S. Pat. No. 3,899,884 to Ekstedt to construct a gas turbine combustion chamber in an annular configuration having inner and outer walls bounding the annular combustion chamber. The combustion chamber is surrounded by an outer housing spaced outwardly from the outer wall of the combustion chamber. The combustion chamber wall comprises a plurality of segments with an upstream end of one segment being located outside and overlapping a downstream end of an adjacent segment. The overlapping portions of the adjacent segments define a space which communicates through at least one main cooling air hole with the space between the combustion chamber and the outer housing. The space also has an outlet such that the air passing through the at least one main cooling air hole into the space will exit substantially tangentially to an inner surface of the adjacent downstream wall segment to cool the inner surface of the combustion chamber. The wall segments also define holes for the primary combustion/dilution to enable the air to pass into the combustion chamber and be mixed with fuel to form a combustible mixture.

As a general rule, such combustion chamber walls define diverse holes to allow the introduction of the requisite air flows into the combustion chamber. The air is required for combustion (through intake holes for primary air and/or dilution air) and to introduce air adjacent to the walls of the combustion chamber to cool the walls during the ongoing combustion process (cooling air intake holes).

In known techniques, the air forms cooling films on the inner surface of the combustion chamber walls (i.e. that surface facing the interior of the combustion chamber) on either side of the primary air intake holes. The positions of the dilution air intakes are typically determined by factors relating to the performance, stability, efficiency and temperature of the combustion chamber.

As a rule, the primary and dilution air intake holes are orifices having widely flanged edges to provide good guidance to the air entering the combustion chamber. Such orifices are difficult to manufacture when the parts of the combustion chamber structure must be machined. Also, the manufacture of such combustion chamber orifices requires the maintenance of a rather large distance between the orifices and the downstream air cooling film.

SUMMARY OF THE INVENTION

The combustion chamber wall structure according to the present invention optimizes the overall effectiveness of the cooling film, while at the same time, minimizing the disturbance of the primary air flow.

It is also an object of the present invention to provide greater latitude with regard to the relative positions of the primary/dilution air holes and the cooling film. It is a further objective to eliminate the disturbances caused by the flanged orifices of the prior art devices, while at the same time keeping the advantages of such an orifice structure.

This is achieved by forming the wall structure of a plurality of segments, each segment having an upstream portion and a downstream portion. The upstream portion is attached to an outer surface of an adjacent wall segment at its downstream portion in an overlapping fashion such that the overlapping portions form a cooling air chamber. The main cooling air holes are defined by the upstream portion so as to communicate with the cooling chamber, which has an exit to direct the cooling air along an inner surface of the downstream portion of the wall segment.

The primary air hole is defined by the downstream portion of the segment and is located adjacent to the main cooling air holes. This location maximizes the distance between the primary air hole and an upstream portion of the same segment, which, in turn, maximizes the distance along the inner surface of the segment on which the cooling air may flow without being disrupted by air passing through the primary air hole. The guidance of the primary/dilution air streams can also be carried out by a portion of the downstream air cooling film.

The effect of the flange-edged orifices is achieved, without usage of the flanges, by the cooling film and the shape of the edges of the structure defining the primary air hole. Optionally, baffle members may be utilized on either side of the primary air hole to increase the efficiency of directing air into the combustion chamber.

In the structure according to the invention, a single structural element defines both the primary air hole as well as the main cooling air holes and may, optionally, also define first complementary cooling air holes located on either side of the primary air hole.

The upstream portion of each of the segments has a first section that is designed to be attached to the downstream portion of the adjacent wall segment so as to extend generally perpendicularly therefrom. The upstream portions also comprise a second section connecting the first section to the downstream portion, which second section may assume a curved configuration. The first section of the upstream portion defines the plurality of main cooling air holes and is attached to the downstream portion of the adjacent wall segment such that the primary cooling air hole of this adjacent segment is adjacent to the main cooling air holes. The primary air hole is located so as to be generally tangent to the junction between the first section of the upstream portion and its attachment to the downstream portion of the wall segment.

The upstream portion of each wall segment may also define a plurality of second complementary cooling air holes.

The primary advantage of the present invention are improved use of the cooling air which forms the cooling films so as to be spread over greater lengths and become more efficient, especially upstream of the primary/dilution air holes. The placement of the holes in cooled zones of the combustion chamber wall limit the induced mechanical stresses, thereby making it possible to shorten each of the wall segments. In a preferred embodiment, the primary/dilution air intake holes are without any projection into the combustion chamber. This configuration greatly facilitates the installation of a refractory lining on the inside of the wall.

DETAILED DESCRIPTION OF THE PREFERRED EMBODIMENT

Figure 1:
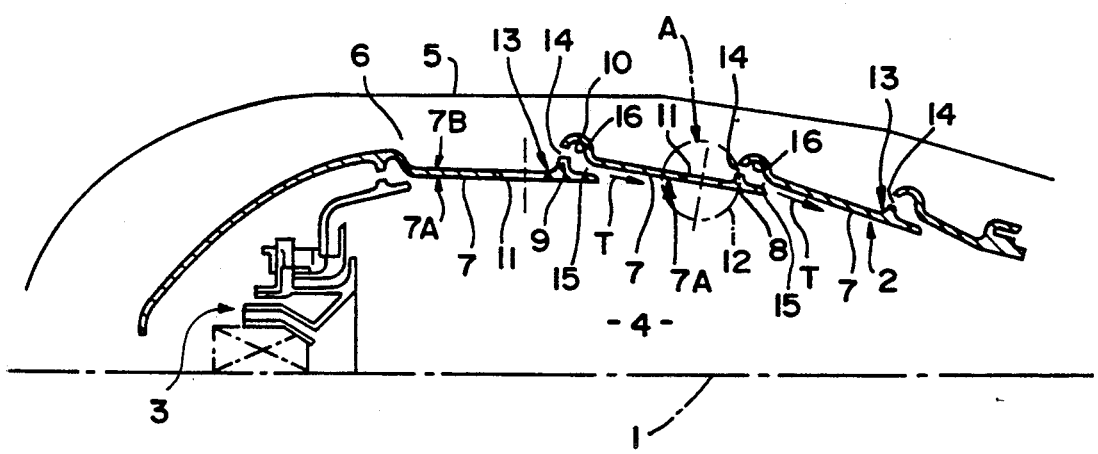
FIG. 1 is a partial, axial cross-sectional view illustrating an outer wall of an annular combustion chamber.

FIG. 1 illustrates a partial, cross-sectional view of an annular combustion chamber of a turbojet engine with axis 1 passing through the center of the fuel injection nozzle 3 and extending from an upstream direction toward a downstream direction (left to right as illustrated in FIG. 1). The combustion chamber comprises a chamber wall 2 in which is mounted the fuel injector nozzle 3 and which bounds the combustion chamber 4. An outer housing 5 encloses the combustion chamber wall 2 and is spaced from the wall to define a space 6 therebetween. An element to support combustion, typically air, is present in this space 6 and must pass through the wall 2 into the combustion chamber 4 so as to be mixed with the fuel emanating from fuel injector 3 to form a combustible mixture. Also, the air is utilized to form cooling air films along the inner surface of the wall 2 in order to prevent damage to the wall caused by the combustion process.

The combustion chamber wall 2 comprises a plurality of wall segments 7 each comprising an upstream portion and a downstream portion. The downstream portions of the wall segments 7 define inner surfaces 7A and outer surfaces 7B. The upstream portion of each of the segments includes a first section 9 which is attached to an outer surface 7B of an upstream adjacent segment such that the first section extends generally perpendicularly from the outer surface 7B. The upstream portion also has a second section 10 which connects the first section 9 with the downstream portion of the wall segment 7.

Figure 2:
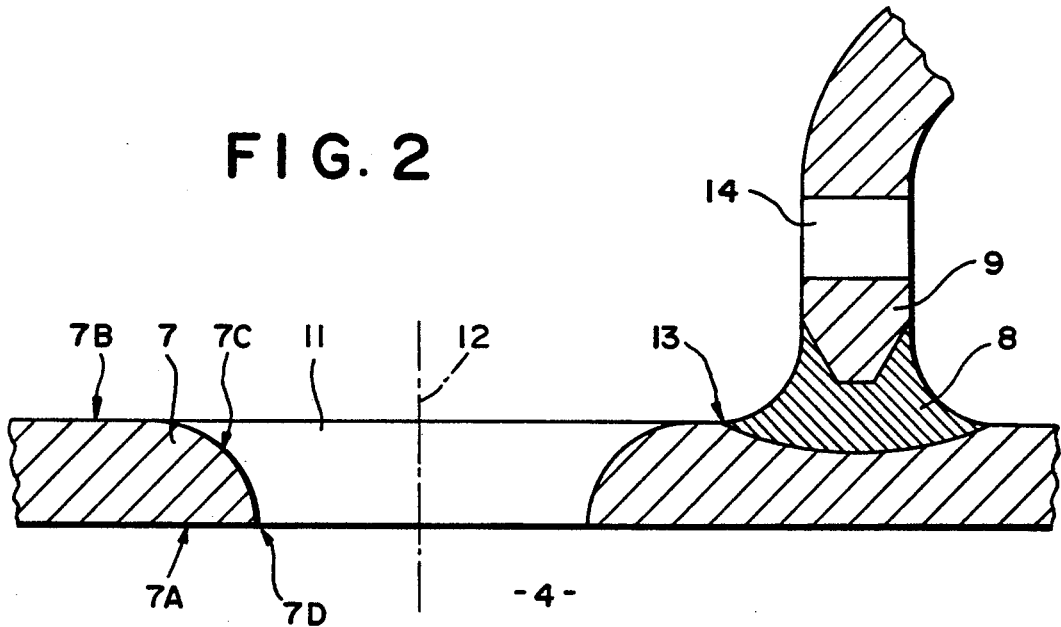
FIG. 2 is an enlarged view of the portion A illustrated in FIG. 1.

The air intakes for the combustion chamber 4 which allow combustion and/or dilution air to pass from space 6 into the combustion chamber 4 are primary air holes 11. As can be seen, the primary air holes 11 are generally circular in configuration and extend about a central axis 12 which, in turn, extends substantially perpendicular to the surfaces 7A and 7B. As best illustrated in FIG. 2, the primary air hole 11 of each wall segment 7 is located adjacent to the first section 9 of the downstream adjacent segment. The first section 9 is attached to the adjacent upstream wall segment by welding, as illustrated at 8, and forms a junction line 13 therewith. The primary air hole 11 is substantially tangent to this junction line. The cross-sectional areas of the primary air holes 11 are relatively large and are designed to supply the combustion/dilution air flows required to maintain satisfactory combustion in combustion chamber 4.

The upstream portion, particularly the first section 9, of each of the segments 7 defines a plurality of relatively smaller, main cooling air holes 14. The main cooling air holes 14 pass through the first section 9 so as to communicate with the space 6, as well as the cooling chamber 15 defined by the upstream portion of one segment and the overlapped, downstream portion of the adjacent segment. The chamber 15 is defined by the inner surface 16 of the upstream portion as well as the overlapped portion of surface 7B of the adjacent wall segment 7.

The cooling chamber 15 has an exit so as to allow the air therein to pass along the inside surface 7A of the downstream portion in a substantial tangential direction, as illustrated by arrows T. This air establishes a cooling film of air along the inner surface 7A to cool the surfaces of the wall exposed to the combustion process. As can best be seen in FIG. 3, the main cooling air holes 14 are significantly smaller in diameter than are the primary combustion holes 11, and are far more numerous.

The surface 7C connecting surfaces 7A and 7B and defining the primary air hole 11 is generally convex in configuration, as illustrated in FIG. 2. The convex surface 7C defines a sharp edge 7D with surface 7A, but does not project beyond surface 7A into the combustion chamber. Surface 7C defines a continuous curve at its juncture with the outer surface 7B.

Figure 3:
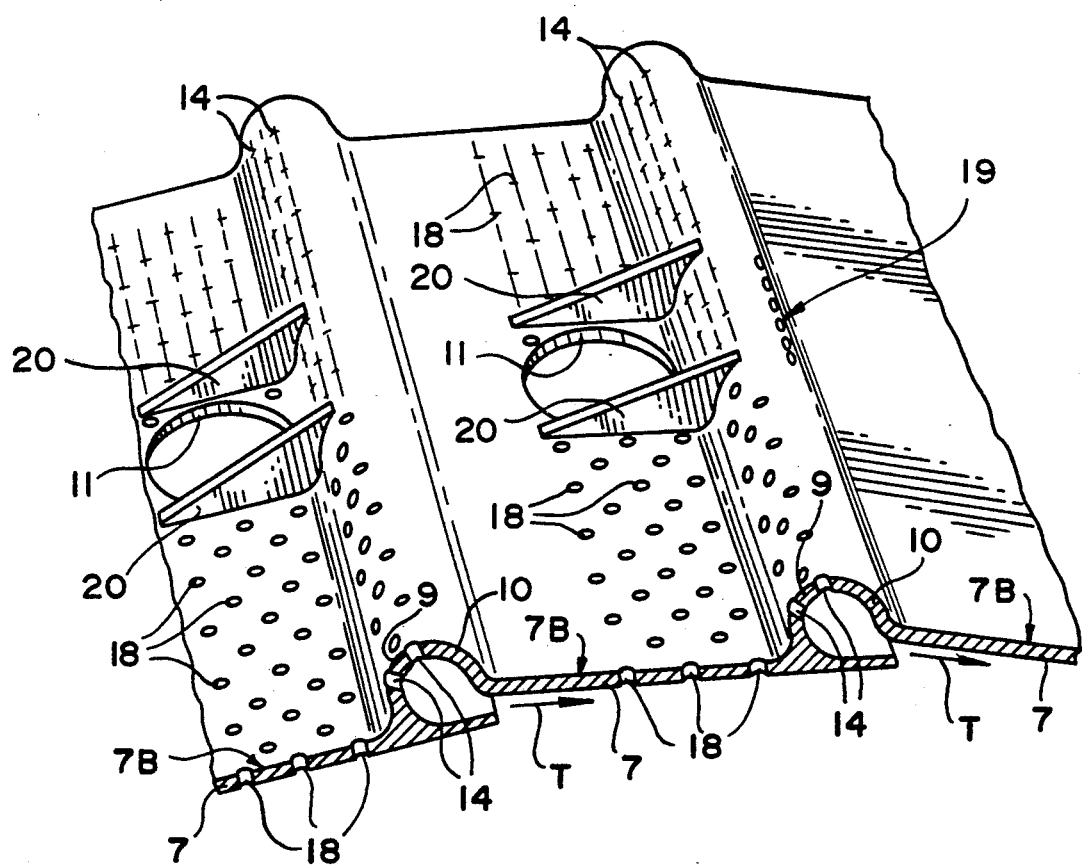
FIG. 3 is a partial, perspective view of the wall structure according to the present invention.

As illustrated in FIG. 3, the aforedescribed wall segments 7 may also define a plurality of relatively small diameter, complementary holes 18 arranged either between two consecutive combustion/dilution air holes 11 or, more preferably, transversely to the axis of the combustion chamber on either side of each of the combustion/dilution air holes 11.

As also illustrated in FIG. 3, baffle members 20 may extend in an upstream-downstream direction on either side of each of the combustion/dilution air holes 11 generally perpendicularly to outer surface 7B. The baffle members 20 may also be in contact with the upstream portion of the adjacent wall segment 7.

By locating the combustion/dilution air holes 11 tangent to the junction lines 13, they are located as close as possible to the first section 9 of the upstream portion of the adjacent wall segment, thereby maximizing the distance between the combustion/dilution air holes 11 and the upstream portion 9, 10 of its own wall segment. This maximizes the length of surface 7A over which the cooling film will pass uninterrupted by any disturbance caused by air passing through the combustion/dilution air hole 11. This optimizes the cooling of the wall segments.

Furthermore, the lack of any projections into the combustion chamber beyond the inner surface 7A of each of the wall segments 7 makes it especially easy to install refractory linings on these inner surfaces 7A and also avoids any disturbance of the cooling air films.

Also, the location of the combustion/dilution air holes 11 adjacent to the upstream portion 9, 10 limits the local stresses which are induced into the prior art wall segments. Furthermore, such a configuration enables the use of axially shorter wall segments having increases strength.

The cooling air passing through the main cooling air holes 14 generates effective cooling films tangent to the inner surfaces 7A of the wall segments 7. The first complementary air holes 18 feed a complement of cooling air along the surface 7A in the axial zone of the combustion/dilution air intake holes in order to increase the efficacy of the cooling air films, which may be hampered in these zones. Second complementary cooling air holes 19 may be located in the second section of the upstream portion of the wall segments 7 to complement the air supplied to the cooling chamber 15, particularly in a static manner.

Whether or not baffle members 20 are used to guide the intake air through the combustion/dilution air holes 11 depends upon the desired operational characteristics of the gas turbine engine. When such baffle plates 20 are used, the efficiency in filling the combustion chamber 4 with combustion/dilution air is increased.

The foregoing description is provided for illustrative purposes only and should not be construed as in any way limiting this invention, the scope of which is defined solely by the appended claims.

We claim:

1. A wall structure for a combustion chamber of a gas turbine engine comprising:
    a) a plurality of wall segments, each wall segment having an upstream portion and a downstream portion, each downstream portion having an inner surface facing into the combustion chamber and an outer surface facing away from the combustion chamber;
    b) means attaching an upstream portion of one segment to the outer surface of the downstream portion of an adjacent segment along a juncture line so as to define a cooling chamber having an outlet facing generally in a downstream direction to direct cooling air along the inner surface of the downstream portion;
    c) a plurality of main cooling air holes having air inlets defined by the upstream portion and communicating with the cooling chamber the upstream portion being oriented such that at least one of the main cooling air holes has an air inlet substantially co-planar with the juncture line; and,
    d) a primary air hole defined by the downstream portion and communicating with the combustion chamber to supply combustion/dilution air to the combustion chamber, and located such that the primary air hole is substantially tangent to the juncture line and is immediately adjacent to the main cooling air holes so as to minimize the disturbances of the cooling air emanating from the cooling chamber and passing along the inner surface of the downstream portion by air passing through the primary air hole.

2. The wall structure of claim 1 further comprising a plurality of first complementary cooling holes defined by the downstream portion such that first complementary cooling holes are located on either side of the primary air hole.

3. The wall structure of claim 1 wherein the upstream portion of each wall segment comprises:
    a) a first section attached to the downstream portion of an adjacent wall segment so as to extend generally perpendicular to the outer surface of the downstream portion, the first section defining the main cooling air holes; and,
    b) a second section connecting the first section to the downstream portion.

4. The wall structure of claim 1 wherein the upstream portion is attached to an adjacent downstream portion by welding.

5. The wall structure of claim 3 further comprising a plurality of second complementary cooling air holes defined by the second section of the upstream portion and communicating with the cooling chamber.

6. The wall structure of claim 1 further comprising at least one baffle member extending from the outer surface of the downstream portion adjacent to the primary air hole.

7. The wall structure of claim 6 comprising two baffle members extending from the outer surface of the downstream portion on either side of the primary air hole.

8. The wall structure of claim 1 wherein the downstream portion defines a primary air hole having a generally circular configuration about a central axis.

9. The wall structure of claim 8 wherein the central axis extends substantially perpendicular to the inner and outer surfaces of the downstream portion.

10. The wall structure of claim 8 wherein the primary air hole is defined by a convex surface connecting the outer surface and the inner surface.

11. The wall structure of claim 10 wherein the convex surface terminates at the inner surface so as to not extend into the combustion chamber.

12. The wall structure of claim 6 wherein the at least one baffle member is generally triangular in shape.

* * * * *